Figure 1:
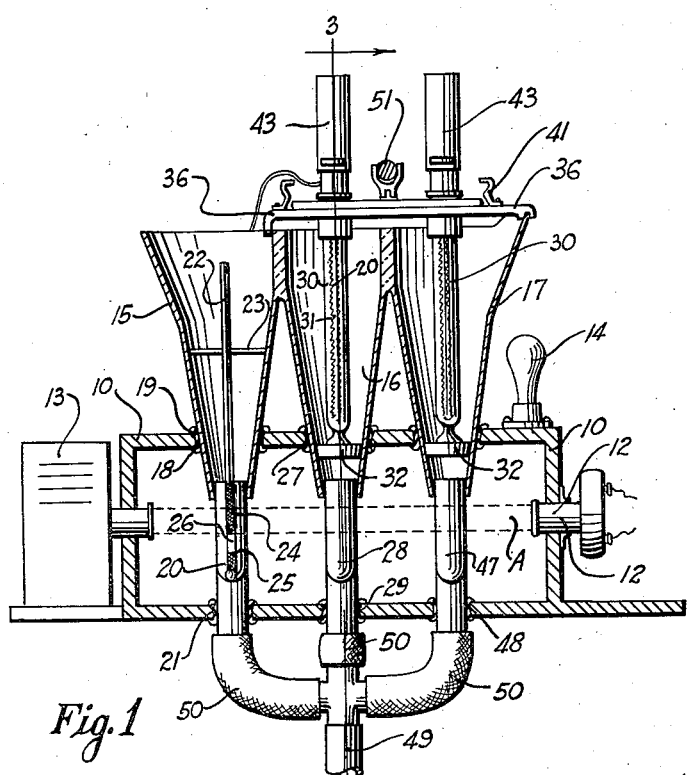

Sept. 27, 1938.  J. H. SHIVELY  2,131,526
LIQUID TESTING DEVICE
Filed May 24, 1937    2 Sheets-Sheet 1

Inventor
James H. Shively
By Jack Ashley
Attorney

Sept. 27, 1938.  J. H. SHIVELY  2,131,526
LIQUID TESTING DEVICE
Filed May 24, 1937  2 Sheets-Sheet 2
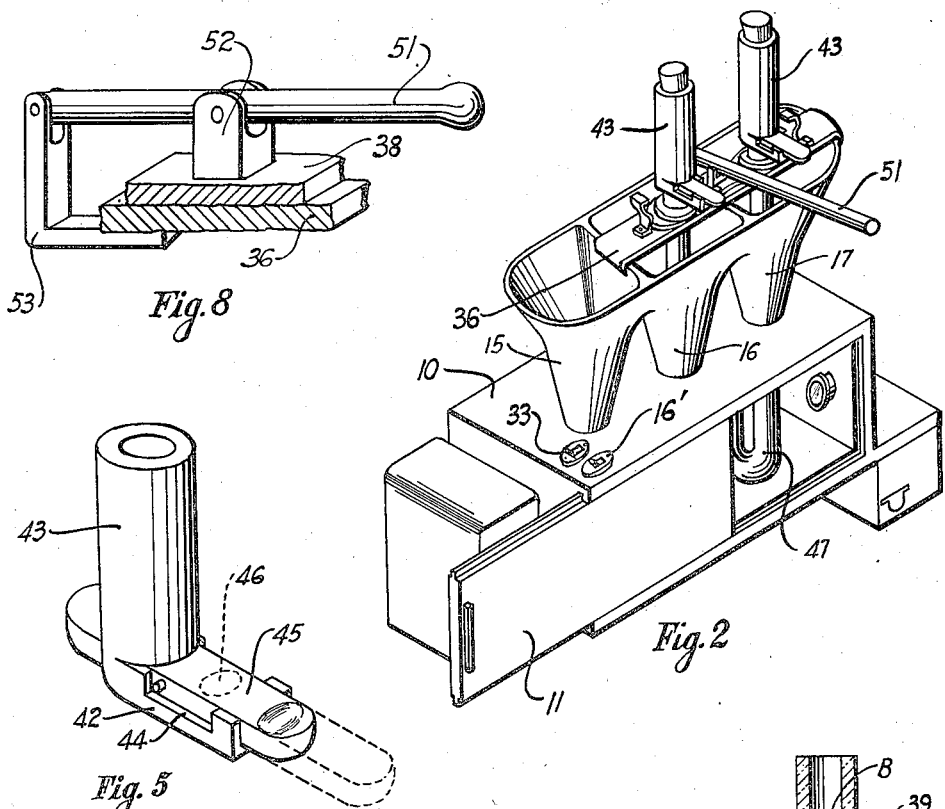
Fig. 8
Fig. 2
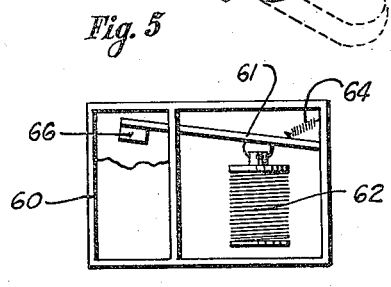
Fig. 5
Fig. 10
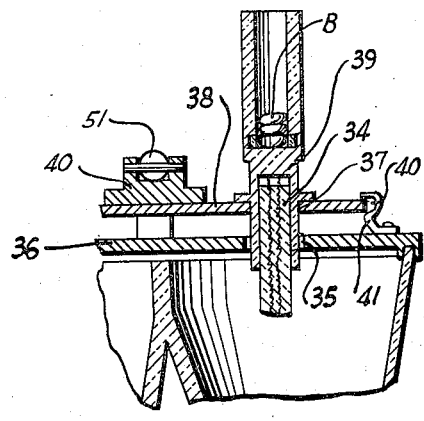
Fig. 7
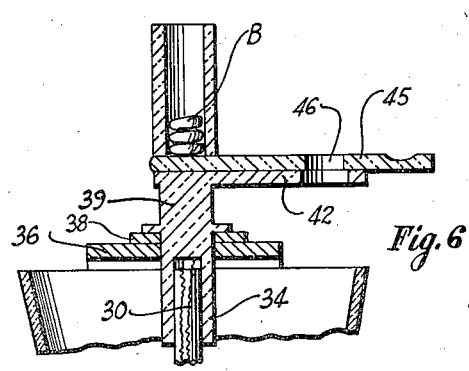
Fig. 6
Inventor
James H. Shively
By Jack Ashley
Attorney Patented Sept. 27, 1938

2,131,526

UNITED STATES PATENT OFFICE 2,131,526

LIQUID TESTING DEVICE

James H. Shively, Houston, Tex.

Application May 24, 1937, Serial No. 144,385

10 Claims. (Cl. 23—253)

This invention relates to new and useful improvements in liquid testing devices.

One object of the invention is to provide an improved device which is particularly adapted for use in making tests of urine to determine the condition of the same.

An important object of the invention is to provide an improved urine testing device which is constructed so that the test may be completed in a minimum space of time and which has positive means for indicating the condition of the liquid, whereby the human element is entirely removed and danger of error in testing is obviated.

Another object of the invention is to provide an improved testing device, wherein the urine may be tested for specific gravity and may also be subjected to the action of reagents to determine the presence of albumin and sugar, with a single means adapted to be operated if the condition of the urine is not up to standard in all respects.

A further object of the invention is to provide an improved testing device, of the character described, wherein an electric eye and photoelectric cell are utilized to indicate when the urine being tested is not up to standard.

Still another object of the invention is to provide an improved testing device so constructed that an accurate test may be had with a very small amount of liquid and which is portable and may be operated by any person, whereby an accurate test may be obtained without the necessity of referring the test to a technician.

A further object of the invention is to provide an improved testing device wherein a hydrometer is employed to determine the specific gravity of the liquid being tested, and additional means for testing the liquid by the action of reagents, which are dropped into said liquid in pellet form by an improved feeding mechanism, whereby a complete test of the liquid may be made in less than two minutes.

A still further object of the invention is to provide an improved testing receptacle wherein a liquid may be subjected to the action of a reagent, said receptacle having a heater therein for heating the liquid to a proper temperature to obtain the results and also having means for trapping the liquid in the receptacle during the action of the reagent and releasing the same after said reagent has dissolved therein.

Still another object of the invention is to provide a testing receptacle wherein a liquid may be tested by dropping thereinto reagents in a pellet form, said receptacle having a heater therein for melting the pellets; when said pellets are melted, the liquid has been heated to a proper temperature where a reaction may occur if the liquid is abnormal, whereby the results of said test may be noted and said receptacle emptied, if desired.

Another object of the invention is to provide a testing device so arranged that a visible indication may be made, or a permanent record given, when a reaction does not occur or, if desired, when a reaction does occur.

A construction designed to carry out the invention will be hereinafter described, together with other features of the invention.

Figure 9:
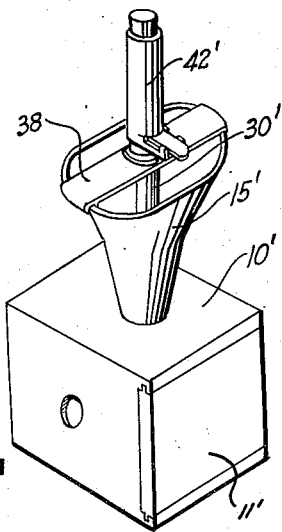
Figure 3:
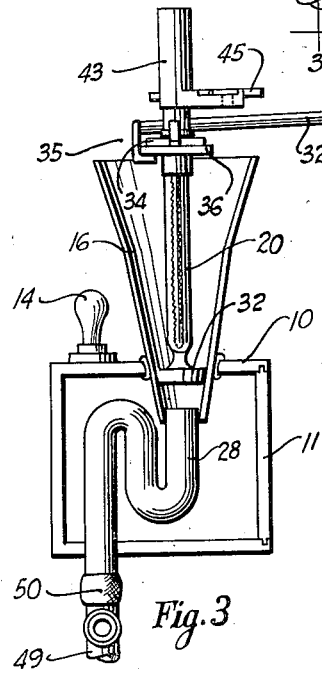
Figure 4:
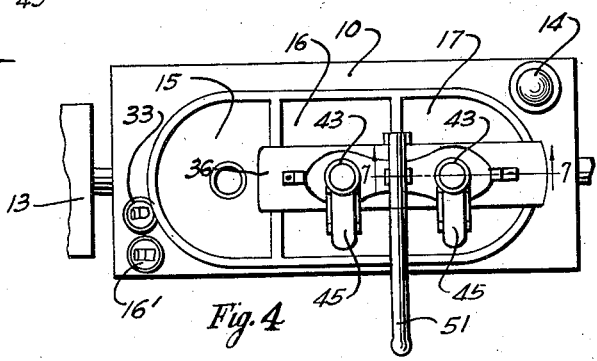

The invention will be more readily understood from a reading of the following specification and by reference to the accompanying drawings, in which an example of the invention is shown, and wherein:

Figure 1 is a longitudinal, sectional view of a testing device, constructed in accordance with the invention, Figure 2 is an isometric view thereof, Figure 3 is a transverse, vertical, sectional view, taken on the line 3—3 of Figure 1, Figure 4 is a plan view, Figure 5 is an isometric view of the dispenser, Figure 6 is a transverse, vertical, sectional view taken through said dispenser, Figure 7 is a longitudinal, sectional view taken on the line 7—7 of Figure 4, Figure 8 is an enlarged isometric detail of the lifting lever, and Figure 9 is an isometric view of a modified form of the invention.

In the drawings, the numeral 10 designates an elongate rectangular casing which is preferably made of brass although it may be made of any suitable material. The casing comprises a "dark box" and has one longitudinal side open, which side is closed by a sliding door or panel 11, whereby access to the interior of the casing may be readily had. A suitable light projecting element 12 is preferably mounted in one end wall of the casing 10, while a photoelectric cell 13 is located in the opposite end wall in alinement with said projecting element, whereby a longitudinal beam or ray of light A is constantly projected onto the photoelectric cell. So long as the beam A is focused on the cell 13, an electric lamp or bulb 14 is lighted, but whenever the beam A is substantially intercepted, then the lamp 14 remains unlighted. The lamp 14 is preferably mounted on the top of the casing 10 at one end thereof, as is clearly shown in Figure 1. A suitable switch 16' may be mounted at the upper end of the cabinet at the opposite end of the lamp 14, for controlling the element 12 and photoelectric cell 13 (Figure 2).

A plurality of conical or funnel-shaped receptacles or containers 15, 16 and 17 are mounted in the top of the casing 10. These receptacles are preferably constructed of glass, porcelain or other suitable material and may be made integral with each other as is shown in Figure 1, or they may be made individually or separately of one another. The receptacle 15 extends through an opening 18 provided in the top of the casing 10 and has its lower end located within the interior of said casing, such lower end terminating at a point above the beam A which is projected longitudinally through the casing. A suitable packing gasket 19 may be inserted within the opening 18 around the receptacle 15. An S-shaped outlet tube 20 leads from the open lower end of the conical receptacle 15 and as clearly shown in Figure 1 has its lower end extending downwardly through an opening 21 in the bottom of the casing. The provision of the S-shaped tube 20 causes liquid which is introduced into the receptacle 15 to be trapped in that portion of the tube 20 immediately below the container or receptacle 15. The tube is constructed of glass or other transparent material, whereby it will not intercept the light beam A.

The receptacle 15 is utilized to ascertain the specific gravity of the liquid being tested and a hydrometer 22 is mounted axially within the receptacle and has its lower end depending into the outlet tube 20, as is shown in Figure 1. A transverse spider or guide 23 is located within the receptacle and has the upper end of the hydrometer 22 slidable therethrough, whereby the axial position of the hydrometer within said receptacle is maintained at all vertical positions of said hydrometer. The lower end of the hydrometer tube is shaded as shown at 24 and 25, whereby an unshaded portion 26 is provided thereon. Manifestly when the unshaded portion 26 is in alinement with the fixed light beam A, said beam may strike the photo electric cell 13 and the lamp 14 will be lighted. However if the hydrometer tube undergoes a vertical movement sufficient to move either of its shaded portions 24 and 25 into alinement with the light beam A, it will be manifest that said beam will be intercepted, whereby the photo electric cell 13 will not light the lamp 14 on the top of the casing 10. The unshaded portion 26 is so located on the hydrometer tube 22 that, when the liquid entered into the receptacle 15 and the outlet pipe 20 is of the proper specific gravity, the hydrometer tube will be moved to a position so that said unshaded portion 26 will be in alinement with the beam or ray A, whereby the interception of said beam does not occur. However, in the event that the specific gravity of the liquid being tested is not up to standard, then the hydrometer tube is moved so that one of its shaded portions 24 or 25 move into alinement with the light beam A to intercept the same. When the light projecting element 12 is turned on by the operation of the switch 16', the lamp 14 will not be lighted, thereby notifying the operator that the liquid is of an improper specific gravity.

Manifestly, the specific gravity of the urine, or other liquid being tested may be ascertained immediately, for as soon as said liquid is introduced into the receptacle, the hydrometer 22 is moved. The switch 16' is turned on to project the light beam A onto the electric cell 13 and if the specific gravity is correct, said beam will not be intercepted and said lamp 14 will remain lighted. Therefore, the test may be made in a matter of seconds.

The receptacle 16 is mounted in the top of the casing 10 in the same manner as is the receptacle 15, the lower end thereof projecting through an opening 27 provided in the top of the casing. An S-shaped tube 28, constructed in exactly the same manner as the tube 20, extends from the lower end of the receptacle 16 and has its lower end extending through an opening 29 in the bottom of the casing. The receptacle 16 is provided for the purpose of testing the urine, or other liquid therein and therefore it is necessary that the liquid be heated and subjected to the action of a reagent. For this purpose, a tubular heater 30 is mounted within the receptacle 16, extending axially thereof and being preferably constructed of glass. An electrical heating element 31 is mounted within the tube 30 while a valve head 32 is secured to the lower end of said tube. The valve element or head 32 may be constructed of glass or other suitable material and has its sides inclined so as to snugly engage the inner wall of the receptacle at the lower end thereof. Obviously, when the valve element is in the position shown in Figure 1, any liquid in the receptacle will be trapped above the valve element.

The heater 30 is, of course, located within the receptacle 16 above the valve element. The operation of the heater may be controlled by a suitable electric switch 33 which is mounted on the top of the casing 10 adjacent the switch 16' which controls the light projecting element 12 and photo electric cell 13. If desired, the heating element may be thermostatically controlled so as to heat the liquid within the receptacle 16 to a proper and desired temperature. The upper end of the glass tube of the heater is mounted within the lower end of an insulating block 34 which block is cylindrical in cross-section. The block extends through an opening 35 provided in a transversely extending, supporting bar or member 36, which member overlies only two of the receptacles, as is clearly shown in Figure 1.

The bar has a width which is much less than the width of the upper end of the receptacle and is supported on the lip of the receptacles 15 and 17. The upper end of the head 34 of the heater 30 is secured in an opening 37 provided in a movable support or plate 38 which overlies the member 36. A cap 39 is fastened to the upper end of the head 34, as is clearly shown in Figure 7. Normally, the plate or support 38 is resting on the member or bar 36; and the heater 30, as well as the valve 32, is in its lowered position, as shown in Figure 1. When the support or plate 38 is raised, as shown in Figure 7, its ends engage recesses 40 provided in spring clips 41 which extend upwardly from the member 36. When so engaged, it will be evident that the heater 30, as well as the valve 32, have been moved upwardly within the receptacle and are held so by said spring clips 41. The upward movement of the valve 32 within the receptacle will permit the liquid thereabove to flow downwardly into the outlet tube 28.

In testing the urine or other liquid, for the presence of sugar therein, the member 38 is moved downwardly to engage the bar 36, whereby the valve 32 is moved to its lowermost position to close the lower end of the receptacle 16. The liquid is then introduced into the receptacle and since the valve is closing the lower end thereof, is trapped therein. The heating element 31 is then energized by operating the switch 33, and the liquid thereby heated to a proper temperature. While the liquid is heating, the reagent is introduced into said liquid, preferably in a pellet form, and is dissolved therein. After the proper temperature and the dissolution of the reagent is complete, the plate 38 is raised, whereby the valve 32 is raised within the receptacle 16 to permit the heated liquid to escape to the outlet tube 28. If sugar is present in the liquid, the reaction of the reagent has produced a change of color in the liquid, which flows into the outlet tube 28, and it will intercept the light beam or ray A, whereby the lamp 14 will not be flashed or lighted. If no sugar is present, then no reaction has occurred and the color of the liquid upon entering the outlet pipe 28 will not intercept the light beam and the lamp will be lighted. Therefore, it will be seen that the liquid may be quickly tested for the presence of sugar therein without any undue delay, the only time involved being that necessary for heating the liquid and melting the pellet. It is pointed out that when the pellet has been melted, the liquid has been heated to a sufficient degree to render a test or reaction and any additional heating is not necessary. Since the receptacles 15, 16 and 17 are relatively small, only a very small amount of liquid is required for the test. The heating element will quickly heat this small amount of liquid and therefore the time necessary for the test is reduced to a minimum. Although the receptacles may be of any desired size, it has been found that receptacles holding approximately one c. c., have been found suitable, although the invention is not to be limited to this size.

The reagent may be placed in the liquid within the receptacle 16 by hand or in any other suitable manner. Also, the reagent may take any desired form, but it is preferable that the reagent take the form of a pellet and that it be automatically dropped into the receptacle when desired. For introducing the reagent pellet into the receptacle 16, it is preferable to employ the dispenser shown in Figures 5 and 6. This dispenser comprises a base 42 which is mounted on the cap 39 of the heater 30 being secured thereto in any suitable manner. The base is provided with an upright sleeve 43 at one end thereof and the reagent pellets B are adapted to be inserted in this sleeve. A horizontal slot 44 is formed within the base 42 beneath the sleeve 43 and a slide 45 is movable through this slot. The slide has an opening 46 extending therethrough and this opening has substantially the same diameter as the interior of the sleeve. By observing Figure 6, it will be seen that when the opening 46 is out of registration with the interior of the sleeve 43, the pellets B are trapped within said sleeve. By moving the slide 45 so that the opening 46 therein moves beneath the sleeve 43, one of the pellets, which is the lowermost one, will drop into the opening 46. The width of the slide member 45 is only sufficient to accommodate a single pellet. By moving the slide 45 forward to the position shown in Figure 6 and in dotted lines in Figure 5, it will be evident that the pellet which is dropped into the opening 46 will fall from said opening as soon as the opening moves out of alinement with the base 42, whereby said pellet will drop into the receptacle. This type of dispenser provides a convenient means for dropping a pellet into the receptacle 16 when it is desired to make a test of the liquid within said receptacle, as has been explained.

The third receptacle 17 is mounted in exactly the same manner as the receptacles 15 and 16. This receptacle includes an outlet pipe or tube 47, similar to the tubes 20 and 28 and has its lower end extending through an opening 48 in the bottom of the casing 10. The extending ends of the tubes 20, 28 and 47 may be suitably connected to a common outlet pipe 49, as by hose connections 50 or otherwise. The interior structure of the receptacle 17 is exactly the same as that of the receptacle 16 including the heater 30, valve 32 and dispenser 42. The mounting of the heater within the supporting plate 38 is exactly the same and a description thereof would merely be repetition. The receptacle 17 is provided in order that the liquid may be tested for albumin, at the same time that it is being tested for sugar. Obviously, all three tests may be run at the same time and in the event that any one thereof shows that the liquid is not up to standard, the light beam A will be intercepted and the lamp 14 will not be lighted, indicating this fact. The tests may then be run individually to determine wherein the liquid fails to come up to standard.

Any suitable means may be employed for raising and lowering the support 38 in order to raise and lower the valve element 32 within the receptacles 16 and 17. However, it is preferable to employ a lever 51, such as is shown in Figure 8. This lever is pivoted within ears 52 which extend upwardly from the support or plate 38. The outer end of the lever is pivoted to an angular brace 53 which is secured to the underside of the member 36. When the lever is swung upwardly, it will be evident that the plate 38 is raised and when the lever is swung downwardly, the plate will be moved downwardly to rest on the member 36. This provides a simple means of operating the valves 32, but it is pointed out that any suitable means may be employed.

From the above, it will be seen that a simple device for taking a complete urinalysis is provided. The urine, or other liquid to be tested, may be entered into the receptacles 15, 16 and 17 simultaneously. The valves 32 in the receptacles 16 and 17 are, of course, in their lowered or closed position to trap the liquid thereabove. The heating element 31 of the heaters 30 in said receptacles are energized to heat the liquid within said receptacles and at the same time the slides 45 of the dispensers are actuated so as to drop the reagent pellets into the receptacles 16 and 17, and the melting of the pellets is begun. Since the receptacle 16 is employed for determining the presence of albumin, it will of course be manifest that different reagents are used in each receptacle. The liquid within the receptacles 16 and 17 is quickly brought to the proper temperature, melting the pellets, at which time the lever 51 is swung upwardly to raise the plates 38 into the recesses 40 of the spring clips 41. This permits the liquid within these receptacles to drain downwardly into the tubes 28 and 47 which are in alinement with the light beam A. The switch 16' is thrown to operate the light projecting element 12 to project said beam A, as has been described. In the event that a reaction has occurred in either of the receptacles 16 and 17, or if the hydrometer 22 has been operated to move the shaded portions 24 and 25 into the light beam, said beam is intercepted which prevents the lighting of the lamp 14. If the liquid comes up to standard, the beam is not intercepted and the lamp 14 flashes or lights.

It is of course evident that although it is desirable to test the liquid in all three receptacles simultaneously in order to reduce the time necessary for the tests, it would be possible to first enter the liquid into the receptacle 15 and determine the specific gravity of said liquid, after which a specimen of the liquid may be introduced into the second receptacle 16, and then finally into the third receptacle 17. Also, it would be possible to eliminate the third receptacle 17 entirely and to utilize the receptacle 16 to test for both sugar and albumin. In such case, however, it would be necessary to flush or cleanse the receptacle 16 after the first test is run, in order to permit a second test to be made in the same receptacle. This would entail more time, but an accurate test could be obtained in this manner.

In Figure 9 a modified form of the invention is shown wherein only a single receptacle 15' is provided. This receptacle is constructed in exactly the same manner as the receptacle 16 being located within a small box or casing 10' which is similar to the casing 10. Since only a single receptacle is provided in this form the plate 38' in which the heater 30' is mounted and which also supports the dispenser 42', rests directly on the lip or upper edge of the receptacle 15' which eliminates the member 36. The operation of this form is exactly the same as the operation of the receptacle 16, as described above. This modified form of the invention is particularly adapted for home use and the same receptacle is utilized to run the tests for the presence of sugar and albumin and for the treating and administering of insulin. Although, the device may be used as readily for testing any liquid and is not to be so limited, the receptacle being cleansed after each test is made.

It is pointed out that either, or both, of the forms may be provided with a card ejecting device, such as shown in Figure 10. However, any suitable means for giving a permanent record of the test may be used. A rectangular card container 60 may be mounted within the box 10 or beneath the same, as desired, and an ejector arm 61 is mounted above the container 60, being pivoted at its inner end to the box 10 and having its outer end overhanging. The outer end of the arm 61 is provided with a sharp pointed needle or pin 66 or other suitable card engaging means. An actuating solenoid 62 has a suitable core bar 63 therein and is pivotally connected to said arm intermediate its ends. A suitable coil spring 64 is also fastened to said arm intermediate its ends, whereby it will be seen that when the solenoid is energized, the core bar 63 will pull the arm toward said solenoid, and the spring will pull said arm and bar in the opposite direction when said solenoid is de-energized. In operation, the solenoid may be energized when the switch 16' is thrown and the lamp 14 remains unlighted, or when said switch is thrown and said lamp does flash. Thus, it is pointed out that a card or other record may be given either to give proof that the liquid being tested is satisfactory and normal, or that said liquid is abnormal and unsatisfactory. The needle 66 is positioned so that it engages the card only when the arm 61 is pulled toward the solenoid and will slip freely over the top card when pulled by the spring 64.

The invention has numerous uses, and a few of these are: for insurance examiners to determine the insurability of an applicant, physicians and hospitals in examining patients, physical examinations for large groups of persons, for individual use in the treating and administering of insulin, and for indicating whether, or not, a reaction has occurred in any liquids being tested. Attention is called to the fact that the door 11 may be pulled out and the light projecting element 12 and photo electric cell 13 dispensed with, so that the human eye may be used to watch and determine the results of the tests, if desired.

What I claim and desire to secure by Letters Patent is:

1. A liquid testing device including, a casing, a light beam directed across the interior of the casing, a receptacle mounted in the top of the casing for receiving liquid to be tested, a hydrometer movable within the receptacle having its lower end in the path of the beam, said lower end of the hydrometer having shaded portions on its surface and a clear portion therebetween, whereby when the liquid being tested is of the normal specific gravity, said clear space is alined with the beam, a second receptacle for receiving a specimen of the liquid being tested mounted in said casing, means for subjecting the liquid within this second receptacle to the action of a reagent, means for conducting the liquid from the receptacle through the said light beam, whereby said light beam is intercepted if a reaction to the reagent has occurred, and also if the specific gravity is abnormal, and means for indicating the interception of the light beam.

2. A liquid testing device including, a casing, a light beam directed across the interior of the casing, a receptacle mounted in the top of the casing for receiving liquid to be tested, a hydrometer movable within the receptacle having its lower end in the path of the beam, said lower end of the hydrometer having shaded portions on its surface and a clear portion therebetwen, whereby when the liquid being tested is of the normal specific gravity, said clear space is alined with the beam, a second receptacle for receiving a specimen of the liquid being tested mounted in said casing, means for subjecting the liquid within this second receptacle to the action of a reagent, means for heating the liquid within the second receptacle while the same is being acted upon by the reagent, means for conducting the liquid from the receptacle through the said light beam, whereby said light beam is intercepted if a reaction to the reagent has occurred, and also if the specific gravity is abnormal, and means for indicating the interception of the light beam.

3. A liquid testing device including, a casing, a light beam directed across the interior of the casing, a receptacle mounted in the top of the casing for receiving liquid to be tested, a hydrometer movable within the receptacle having its lower end in the path of the beam, said lower end of the hydrometer having shaded portions on its surface and a clear portion therebetween, whereby when the liquid being tested is of the normal specific gravity, said clear space is alined with the beam, a second receptacle for receiving a specimen of the liquid being tested mounted in the container, means for trapping the liquid in the receptacle, a dispenser for introducing a reagent into said trapped liquid to subject the liquid to the action thereof to determine the presence of an extraneous substance thereof, said reagent causing the liquid to become cloudy or discolored if a reaction occurs, means for conducting the liquid from said receptacle through the said light beam thereby if the same is cloudy or discolored, and also if the specific gravity is abnormal said beam will be intercepted, and means actuated by the interception of the light beam for indicating the interception thereof.

4. A liquid testing device including, a casing, a photo electric cell mounted in one wall of the casing, a receptacle mounted in the top of the casing for receiving liquid to be tested, a hydrometer movable within the receptacle having its lower end in the path of the beam, said lower end of the hydrometer having shaded portions on its surface and a clear portion therebetween, whereby when the liquid being tested is of the normal specific gravity, said clear space is alined with the beam, a second receptacle for receiving a specimen of the liquid being tested mounted in the container, means for trapping the liquid in the receptacle, means within said receptacle for heating the liquid therein, a dispenser for introducing a reagent into said trapped liquid to subject the liquid to the action thereof to determine the presence of an extraneous substance thereof, said reagent causing the liquid to become cloudy or change color if a reaction occurs, means for conducting the liquid from said receptacle through the said light beam whereby if the same is cloudy or discolored, and also if the specific gravity is abnormal said beam will be intercepted, and means actuated by the interception of the light beam for indicating the interception thereof.

5. A liquid testing device including, a casing, a light beam directed across the interior of the casing, a receptacle mounted in the top of the casing for receiving liquid to be tested, a hydrometer movable within the receptacle having its lower end in the path of the beam, said lower end of the hydrometer having shaded portions on its surface and a clear portion therebetween, whereby when the liquid being tested is of the normal specific gravity, said clear space is alined with the beam, a second receptacle for receiving a specimen of the liquid being tested mounted in the container, means for trapping the liquid in the receptacle, a dispenser for introducing a reagent into said trapped liquid to subject the liquid to the action thereof to determine the presence of an extraneous substance thereof, said reagent causing the liquid to become cloudy if a reaction occurs, means for conducting the liquid from said receptacle through the said light beam, a third receptacle mounted in the casing for receiving a specimen of the liquid to be tested, means for trapping liquid in this receptacle, a dispenser for introducing a reagent different from the reagent introduced into the second receptacle into said trapped liquid to determine the presence of an extraneous substance in the liquid, said reagent causing the liquid to change color if a reaction occurs, means for conducting the liquid from this third receptacle through the said light beam to intercept the same if said liquid has changed color, and also if the liquid in either of the first two mentioned receptacles is abnormal and means actuated by the interception of the light beam for indicating the interception thereof.

6. A liquid testing device including, a casing, a light beam directed across the interior of the casing, a receptacle mounted in the top of the casing for receiving liquid to be tested, a hydrometer movable within the receptacle having its lower end in the path of the beam, said lower end of the hydrometer having shaded portions on its surface and a clear portion therebetween, whereby when the liquid being tested is of the normal specific gravity, said clear space is alined with the beam, a second receptacle for receiving a specimen of the liquid being tested mounted in the container, means for trapping the liquid in the receptacle, a dispenser for introducing a reagent into said trapped liquid to subject the liquid to the action thereof to determine the presence of an extraneous substance thereof, said reagent causing the liquid to become cloudy if a reaction occurs, means for conducting the liquid from said receptacle through the said light beam, a third receptacle mounted in the casing for receiving a specimen of the liquid to be tested, means for trapping liquid in this receptacle, a dispenser for introducing a reagent different from the reagent introduced into the second receptacle into said trapped liquid to determine the presence of an extraneous substance in the liquid, said reagent causing the liquid to change color if a reaction occurs, means for conducting the liquid from this third receptacle through the said light beam to intercept the same if said liquid has changed color, and also if the liquid in either of the first two mentioned receptacles is abnormal and means for giving a record of the non-interception of the light beam.

7. A liquid testing device including, a casing, a light beam directed across the interior of the casing, a receptacle mounted in the top of the casing for receiving liquid to be tested, a hydrometer movable within the receptacle having its lower end in the path of the beam, said lower end of the hydrometer having shaded portions on its surface and a clear portion therebetween, whereby when the liquid being tested is of the normal specific gravity, said clear space is alined with the beam, a second receptacle for receiving a specimen of the liquid being tested mounted in said casing, means for subjecting the liquid within this second receptacle to the action of a reagent, means for heating the liquid within the second receptacle while the same is being acted upon by the reagent, means for conducting the liquid from the receptacle through the said light beam, whereby said light beam is intercepted if a reaction to the reagent has occurred, and also if the specific gravity is abnormal and means for giving a record of the non-interception of the light beam.

8. A liquid testing device including a cabinet, means to project a light beam therethrough, a multiplicity of receptacles mounted in the cabinet each receptacle having a transparent extension positioned within the path of the light beam, a hydrometer in one receptacle and having a transparent portion normally positioned in the path of the light beam and shaded portions immediately above and below the transparent portion whereby the upward or downward movement of the hydrometer will cause a shaded portion to intercept the light beam, means for subjecting the liquid in a second receptacle to the action of a reagent, whereby the said light beam is intercepted if a reaction of the liquid to the reagent has occurred.

9. A liquid testing device including a cabinet, means to project a light beam therethrough, a multiplicity of receptacles mounted in the cabinet each receptacle having a transparent extension positioned within the path of the light beam, a hydrometer in one receptacle and having a transparent portion normally positioned in the path of the light beam and shaded portions immediately above and below the transparent portion whereby the upward or downward movement of the hydrometer will cause a shaded portion to intercept the light beam, means for subjecting the liquid in a second receptacle to the action of a reagent, whereby the said light beam is intercepted if a reaction of the liquid to the reagent has occurred, and means for subjecting the liquid in a third receptacle to the action of a reagent different from the reagent used in the second receptacle, whereby the said light beam is intercepted if a reaction of the liquid to the reagent has occurred.

10. A liquid testing device including a cabinet, means to project a light beam therethrough, a multiplicity of receptacles mounted in the cabinet each receptacle having a transparent extension positioned within the path of the light beam, a hydrometer in one receptacle and having a transparent portion normally positioned in the path of the light beam and shaded portions immediately above and below the transparent portion whereby the upward or downward movement of the hydrometer will cause a shaded portion to intercept the light beam, means for subjecting the liquid in a second receptacle to the action of a reagent, whereby the said light beam is intercepted if a reaction of the liquid to the reagent has occurred, and means actuated by the interception of the light beam for indicating the interception thereof.

JAMES H. SHIVELY.